United States Patent
Sokolov et al.

(10) Patent No.: US 9,544,287 B1
(45) Date of Patent: Jan. 10, 2017

(54) SYSTEMS AND METHODS FOR PERFORMING AUTHENTICATION AT A NETWORK DEVICE

(71) Applicant: Symantec Corporation, Mountain View, CA (US)

(72) Inventors: Ilya Sokolov, Boston, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/489,987

(22) Filed: Sep. 18, 2014

(51) Int. Cl.
*H04L 29/06* (2006.01)

(52) U.S. Cl.
CPC .................... *H04L 63/08* (2013.01)

(58) Field of Classification Search
CPC ...... G06F 21/31; G06F 21/41; H04L 63/0815; H04L 63/105
USPC .............................................. 726/6
See application file for complete search history.

(56) References Cited

U.S. PATENT DOCUMENTS

| | | | |
|---|---|---|---|
| 2002/0122553 A1* | 9/2002 | Kao | H04L 9/0891 380/28 |
| 2005/0015490 A1* | 1/2005 | Saare | H04L 63/0815 709/225 |
| 2007/0282909 A1* | 12/2007 | Watson, Jr. | G06F 21/31 |
| 2012/0011567 A1* | 1/2012 | Cronk | H04L 63/102 726/4 |

OTHER PUBLICATIONS

Keith Newstadt, et al; Systems and Methods for Identifying Physical Locations of Users; U.S. Appl. No. 14/489,948, filed Sep. 18, 2014.
"Authentication", https://www.trustedcomputinggroup.org/solutions/authentication, as accessed Jul. 23, 2014, Trusted Computing Group, (Jun. 24, 2011).
"Description of the Secure Sockets Layer (SSL) Handshake", http://support.microsoft.com/kb/257591, as accessed Jul. 23, 2014, Microsoft, (Nov. 24, 2004).
"Hypertext Transfer Protocol", http://en.wikipedia.org/wiki/Hypertext_Transfer_Protocol, as accessed Jul. 23, 2014, Wikipedia, (Oct. 8, 2005).

(Continued)

*Primary Examiner* — Syed Zaidi
(74) *Attorney, Agent, or Firm* — FisherBroyles, LLC (57) ABSTRACT

The disclosed computer-implemented method for performing authentication at a network device may include (1) storing, at a network device that handles traffic for at least one endpoint device within a network, an authentication credential associated with a user of the endpoint device, (2) detecting, at the network device, a communication between the endpoint device within the network and a cloud-based application outside the network, (3) determining, at the network device, that access to the cloud-based application is protected by an authentication process, and (4) causing the network device to complete at least a portion of the authentication process for the user by providing the authentication credential associated with the user from the network device to an identity provider of the cloud-based application. Various other methods, systems, and computer-readable media are also disclosed.

20 Claims, 5 Drawing Sheets

(56) References Cited

OTHER PUBLICATIONS

"What are Cloud-Based Applications?", https://www.infostreet.com/cloud-desktop/what-are-cloud-based-applications/, as accessed Jul. 23, 2014, InfoStreet, Inc., (1994).

"Network packet", http://en.wikipedia.org/wiki/Network_packet, as accessed Jul. 23, 2014, Wikipedia, (Feb. 21, 2011).

\* cited by examiner

SYSTEMS AND METHODS FOR PERFORMING AUTHENTICATION AT A NETWORK DEVICE

BACKGROUND

Cloud-based applications may offer users efficient and convenient access to a variety of data, media, services, and/or additional content. In addition, cloud-based applications may be accessed via a variety of computing devices and networks. In some cases, because cloud-based applications may support multiple access points and transmit data over a network, information within cloud-based applications may be vulnerable to access by unauthorized parties. As a security measure, many cloud-based applications may require users to complete an authentication process (e.g., entering login credentials) before being granted access to content within the applications.

Unfortunately, traditional authentication systems may impact the usability and convenience of a cloud-based application. For example, many devices (e.g., internet-enabled televisions and Blu-ray players) used to access cloud-based applications within a home network may not be equipped with user interfaces suitable for efficiently completing authentication processes. In addition, many users may access a cloud-based application via multiple devices within a single network, which may involve completing a separate authentication process on each device. Completing separate authentication processes on multiple devices may be tedious and may have security implications. As such, the current disclosure identifies and addresses a need for additional and improved systems and methods for authenticating users to cloud-based applications.

SUMMARY

As will be described in greater detail below, the instant disclosure describes various systems and methods for performing authentication at a network device by providing an authentication credential associated with a user from the network device to an identity provider of a cloud-based application. The identity provider may authenticate the user to the cloud-based application in response to receiving and verifying the authentication credential.

In one example, a computer-implemented method for performing authentication at a network device may include (1) storing, at a network device that handles traffic for at least one endpoint device within a network, an authentication credential associated with a user of the endpoint device, (2) detecting, at the network device, a communication between the endpoint device within the network and a cloud-based application outside the network, (3) determining, at the network device, that access to the cloud-based application is protected by an authentication process, and (4) causing the network device to complete at least a portion of the authentication process for the user by providing the authentication credential associated with the user from the network device to an identity provider of the cloud-based application. In some embodiments, the network device may represent a router.

In some examples, the method may further include detecting, at the network device, a second communication between a second endpoint device within the network and the cloud-based application. The method may also include determining, at the network device, that access to the cloud-based application from the second endpoint device is protected by a second authentication process. Furthermore, the method may include causing the network device to complete at least a portion of the second authentication process for the user by providing the authentication credential associated with the user from the network device to the identity provider of the cloud-based application.

In some embodiments, the authentication credential associated with the user may include a private key assigned to the user. Additionally or alternatively, the authentication credential associated with the user may include a username and/or a password created by the user.

In some examples, detecting the communication between the endpoint device and the cloud-based application may include detecting a communication sent from the endpoint device to the cloud-based application. In these examples, providing the authentication credential associated with the user may include signing the communication with a private key assigned to the user and forwarding the signed communication to the identity provider.

In some embodiments, after providing the authentication credential to the identity provider, the method may include determining that the identity provider verifies the authentication credential and asserts the identity of the user to cloud-based application. In such embodiments, the method may then include causing the network device to facilitate access for the user to the cloud-based application.

In some examples, determining that access to the cloud-based application is protected by the authentication process may include determining that the communication between the endpoint device and the cloud-based application requests completion of the authentication process. Additionally or alternatively, determining that access to the cloud-based application is protected by the authentication process may include determining that the cloud-based application requests the user to complete at least a portion of the authentication process on the endpoint device before being granted access to the cloud-based application.

In some embodiments, the authentication process may include completion of a single authentication factor. In such embodiments, the network device may complete the single authentication factor by providing the authentication credential to the identity provider. In other embodiments, the authentication process may include completion of a first authentication factor and at least one additional authentication factor. In such embodiments, the network device may complete the first authentication factor by providing the authentication credential to the identity provider and the additional authentication factor may be completed at the endpoint device.

In one embodiment, a system for implementing the above-described method may include (1) a storing module that stores, at a network device that handles traffic for at least one endpoint device within a network, an authentication credential associated with a user of the endpoint device, (2) a detection module that detects, at the network device, a communication between the endpoint device within the network and a cloud-based application outside the network, (3) a determination module that determines, at the network device, that access to the cloud-based application is protected by an authentication process, and (4) a completion module that causes the network device to complete at least a portion of the authentication process for the user by providing the authentication credential associated with the user from the network device to an identity provider of the cloud-based application. In addition, the system may include at least one processor that executes the storing module, the detection module, the determination module, and the completion module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) store, at a network device that handles traffic for at least one endpoint device within a network, an authentication credential associated with a user of the endpoint device, (2) detect, at the network device, a communication between the endpoint device within the network and a cloud-based application outside the network, (3) determine, at the network device, that access to the cloud-based application is protected by an authentication process, and (4) cause the network device to complete at least a portion of the authentication process for the user by providing the authentication credential associated with the user from the network device to an identity provider of the cloud-based application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for performing authentication at a network device. As will be explained in greater detail below, by providing an authentication credential associated with a user to a cloud-based application, the systems and methods described herein may facilitate providing the user with access to the cloud-based application. For example, by providing an authentication credential via a network device, the disclosed systems and methods may eliminate the need for a user to enter login credentials into a device not designed for user interaction and/or may provide an additional level of security for information stored within a cloud-based application. Furthermore, the described systems and methods may enable a user to quickly and easily access a cloud-based application (or multiple cloud-based applications) via multiple end-point devices.

Figure 1:
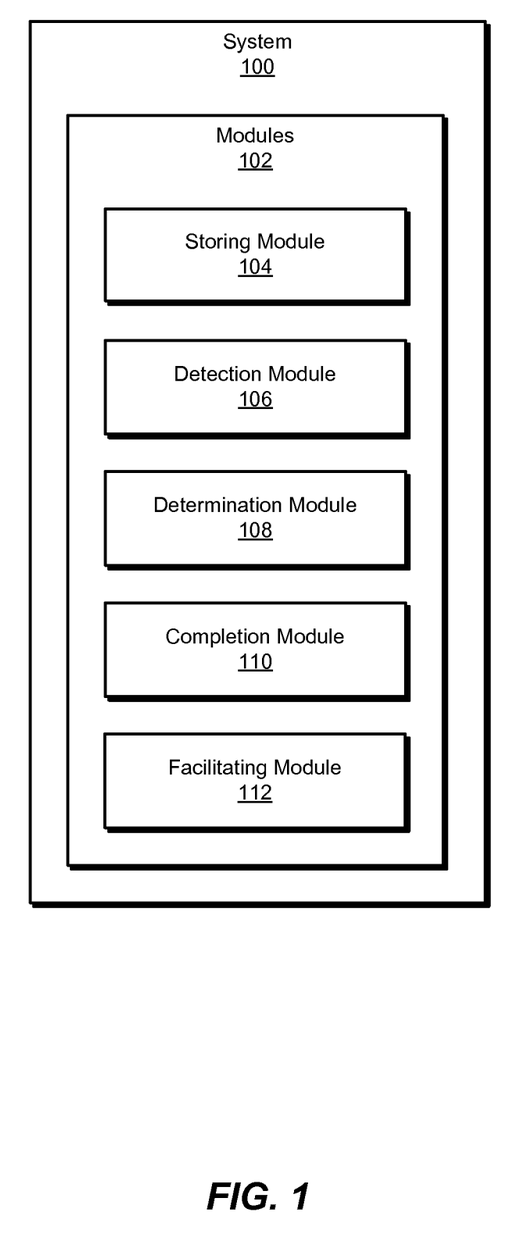
FIG. 1 is a block diagram of an exemplary system for performing authentication at a network device.
Figure 2:
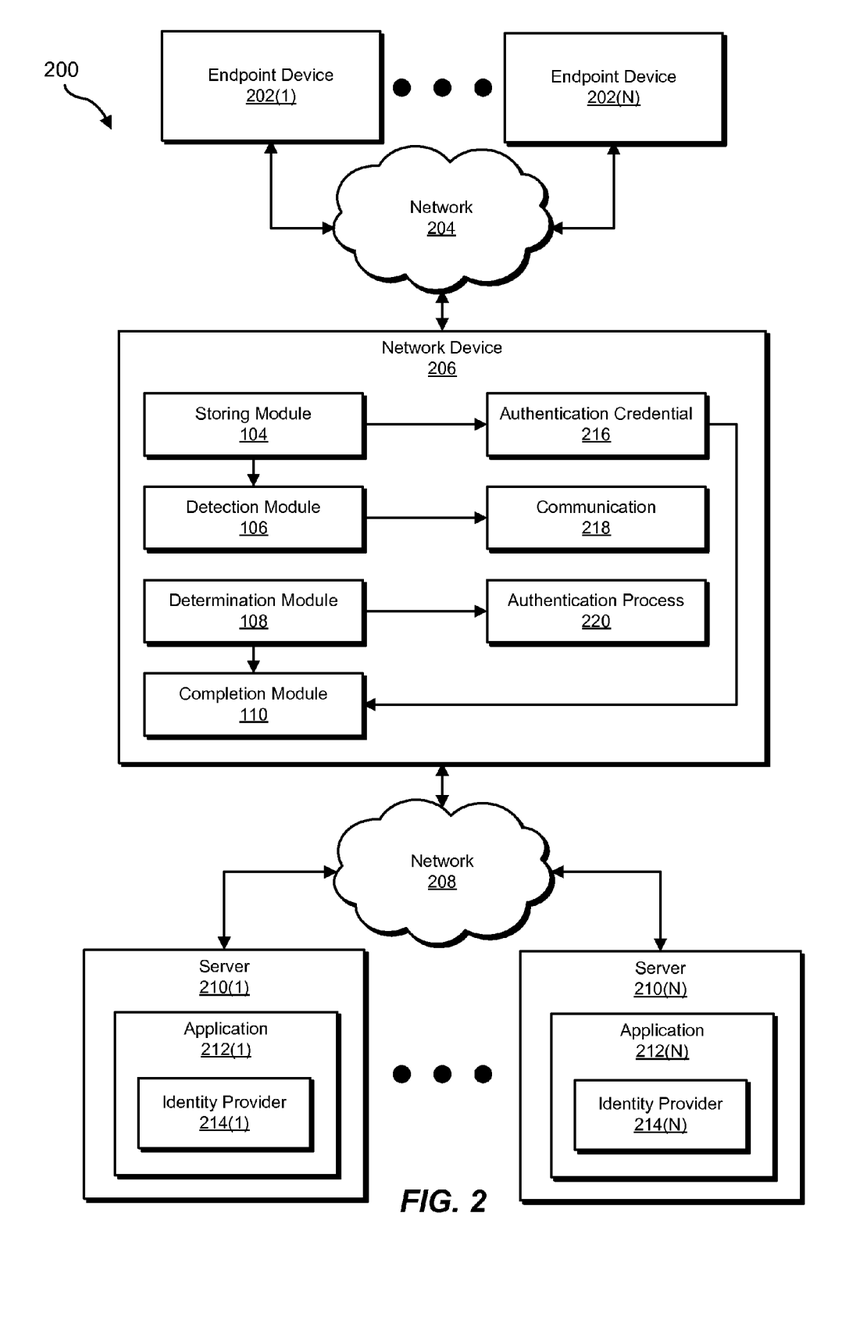
FIG. 2 is a block diagram of an additional exemplary system for performing authentication at a network device.

The following will provide, with reference to FIGS. 1 and 2, detailed descriptions of exemplary systems for performing authentication at a network device. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for performing authentication at a network device. As illustrated in this figure, exemplary system 100 may include one or more modules 102 for performing one or more tasks. For example, and as will be explained in greater detail below, exemplary system 100 may include a storing module 104 that stores, at a network device that handles traffic for at least one endpoint device within a network, an authentication credential associated with a user of the endpoint device. Exemplary system 100 may also include a detection module 106 that detects, at the network device, a communication between the endpoint device within the network and a cloud-based application outside the network.

In addition, and as will be described in greater detail below, exemplary system 100 may include a determination module 108 that determines, at the network device, that access to the cloud-based application is protected by an authentication process. Furthermore, exemplary system 100 may include a completion module 110 that causes the network device to complete at least a portion of the authentication process for the user by providing the authentication credential associated with the user from the network device to an identity provider of the cloud-based application. Finally, exemplary system 100 may include a facilitating module 112 that causes the network device to facilitate access for the user to the cloud-based application in response to the determination that the identity provider verifies the authentication credential. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., endpoint devices 202(1)-(N), network device 206, and/or servers 210(1)-(N)), computing system 410 in FIG. 4, and/or portions of exemplary network architecture 500 in FIG. 5. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 206 in communication with endpoint devices 202(1)-(N) via a network 204. Also as shown in FIG.

2, network device 206 may be in communication with servers 210(1)-(N) via a network 208. In one example, network device 206 may be programmed with one or more of modules 102 and may facilitate communication between endpoint devices 202(1)-(N) and servers 210(1)-(N). Additionally or alternatively, endpoint devices 202(1)-(N) and/or servers 210(1)-(N) may be programmed with one or more of modules 102 in order to facilitate a user accessing applications 210(1)-(N) via endpoint devices 202(1)-(N).

In one embodiment, one or more of modules 102 from FIG. 1 may, when executed by at least one processor of network device 206, enable network device 206 to perform authentication at a network device. For example, and as will be described in greater detail below, storing module 104 may cause network device 206 to store an authentication credential (e.g., authentication credential 216) associated with a user of an endpoint device (e.g., one of endpoint devices 202(1)-(N)). In addition, detection module 106 may cause network device 206 to detect a communication (e.g., communication 218) between one of endpoint devices 202(1)-(N) and a cloud-based application (e.g., one of applications 212(1)-(N)). Next, determination module 108 may cause network device 206 to determine that access to one of cloud-based applications 212(1)-(N) is protected by an authentication process (e.g., authentication process 220). Finally, completion module 110 may cause network device 206 to complete at least a portion of authentication process 220 for the user by providing authentication credential 216 from network device 206 to an identity provider (e.g., one of identity providers 214(1)-(N)) of one of applications 212(1)-(N).

Network device 206 generally represents any type or form of network appliance or device capable of forwarding traffic (e.g., packets) between computing devices within a local network and/or an external network. In some examples, network device 206 may represent a modem and/or a router. The term "modem," as used herein, generally refers to any type or form of device that establishes a connection to the internet (e.g., to an internet service provider) and extends the internet connection to one or more additional devices. In some examples, a modem may connect multiple computing devices to the internet via a router (e.g., creating a local or internal network). The term "router," as used herein, generally refers to any type or form of device that forwards traffic between devices within a local network and/or to external networks via a modem. In some examples, network device 206 may represent either a modem or a router. In other examples, network device 206 may provide the functionality of both a modem and a router. Network device 206 may also be a network appliance, such as an APOLLO-enabled router or thin client.

Endpoint devices 202(1)-(N) generally represent any type or form of computing devices capable of hosting and/or accessing applications 212(1)-(N) via network device 206. In some examples, all or a portion of endpoint devices 202(1)-(N) may be owned and/or accessed by a particular user. In addition, two or more of endpoint devices 202(1)-(N) may be connected to each other via network 204. Examples of endpoint devices 202(1)-(N) include, without limitation, laptops, tablets, desktops, servers, cellular phones, Personal Digital Assistants (PDAs), multimedia players, wearable devices (e.g., smart watches, smart glasses, etc.), gaming consoles, internet-enabled televisions, DVD players, and Blu-ray players, combinations of one or more of the same, exemplary computing system 410 in FIG. 4, or any other suitable endpoint device.

Network 204 generally represents any medium or architecture capable of facilitating communication or data transfer. As noted, network 204 may facilitate communication between two or more of endpoint devices 202(1)-(N). In addition, network 204 may facilitate communication between endpoint devices 202(1)-(N) and network device 206. In some examples, network 204 may represent a Local Area Network (LAN), such as a home network. Additional examples of network 204 include, without limitation, an intranet, a Wide Area Network (WAN), a Personal Area Network (PAN), and/or any other suitable type of network. Network 204 may facilitate communication or data transfer using wireless or wired connections.

Servers 210(1)-(N) generally represent any type or form of computing devices that are capable of hosting applications 212(1)-(N) and facilitating access to applications 212(1)-(N) via network 208 and/or network device 206. Each of servers 210(1)-(N) may store and/or host one or more of applications 212(1)-(N). In addition, in some examples, servers 210(1)-(N) may be in communication with each other and/or maintained by a single entity (e.g., servers 210(1)-(N) may be maintained in a server farm). Alternatively, servers 210(1)-(N) may be maintained by multiple entities. Examples of servers 210(1)-(N) include, without limitation, application servers and database servers configured to provide various database services and/or run certain software applications.

As noted, servers 210(1)-(N) may store applications 212(1)-(N). Applications 212(1)-(N) generally represent any type or form of cloud-based application. The term "cloud-based application," as used herein, generally represents any instance or collection of software, files, or executable code that may be accessed remotely via the internet. Cloud-based applications may provide a variety of services to a user, such as data backup and storage services, social networking services, media streaming services, gaming services, financial services, etc. In some examples, users may gain access to the services provided by a cloud-based application by completing one or more authentication processes (e.g., entering login credentials).

As noted, network 208 may facilitate communication between servers 210(1)-(N) and network device 206. Network 208 generally represents any medium or architecture capable of facilitating communication or data transfer. In some examples, network 208 may represent a Wide Area Network (WAN). Additional examples of network 208 include, without limitation, an intranet, a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 208 may facilitate communication or data transfer using wireless or wired connections.

Figure 3:
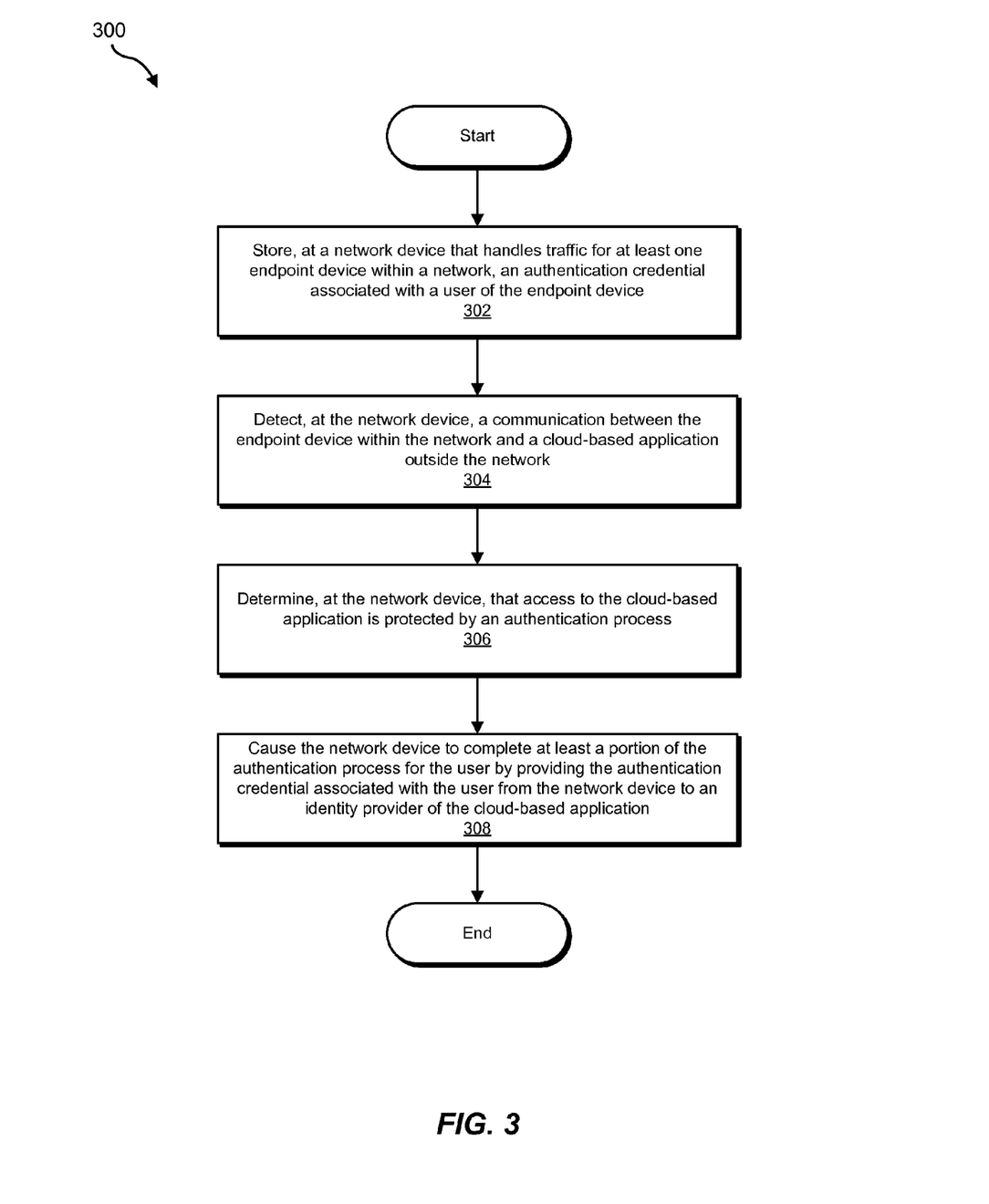
FIG. 3 is a flow diagram of an exemplary method for performing authentication at a network device.

FIG. 3 is a flow diagram of an exemplary computer-implemented method 300 for performing authentication at a network device. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may store, at a network device that handles traffic for at least one endpoint device within a network, an authentication credential associated with a user of the endpoint device. For example, storing module 104 may, as part of network device 206 in FIG. 2, store authentication credential 216 at network device 206. In some examples, authentication credential 216 may be associated with a user of one or more of endpoint devices 202(1)-(N).

The term "authentication credential," as used herein, generally refers to any type or form of string, input, certificate, and/or signature that may be provided to an application or service by a user or entity in order to facilitate the user accessing content within the application or service. In one embodiment, an authentication credential may represent a username and/or password created by a user. In another embodiment, an authentication credential may represent any of a variety of cryptographic keys assigned to a user and/or assigned to a device associated with a user. For example, an authentication credential may represent a symmetric key. The term "symmetric key," as used herein, generally refers to any type or form of cryptographic algorithm that is known by two parties and used to forward encrypted data between the parties. For example, data encrypted with a symmetric key by one entity may be decrypted by another entity using the same symmetric key.

In another example, an authentication credential may represent a private key (e.g., an asymmetric key). The term "private key," as used herein, generally refers to any type or form of cryptographic algorithm that is associated with and known only by a particular device, user, or other entity. In some examples, data encrypted or "signed" with a private key may only be decrypted with a public key that corresponds to the private key. A public key and private key may be mathematically linked but a private key may not be derived from its corresponding public key. As such, data encrypted with a public key may be guaranteed to have originated from a secure and verified source.

The systems and methods described herein may store an authentication credential in a variety of ways. For example, storing module 104 may store authentication credential 216 in any manner such that authentication credential 216 may be easily and efficiently accessed in response to receiving communication 218. Specifically, storing module 104 may store authentication credential 216 in local memory, fast-access memory (e.g., a cache or RAM), a hard disk, a solid state drive, and/or in any additional type of memory. In addition, storing module 104 may receive authentication credential 216 from a variety of sources, including the user and/or endpoint device 202(1).

Returning to FIG. 3, at step 304 one or more of the systems described herein may detect, at the network device, a communication between the endpoint device within the network and a cloud-based application outside the network. For example, detection module 106 may, as part of network device 206 in FIG. 2, detect communication 218 between endpoint device 202(1) and application 212(1).

The term "communication," as used herein, generally refers to any section or of portion of data transmitted over a network. In some examples, a communication may represent a packet. A packet may contain user data or a payload (e.g., the message or body of a communication). In addition, a packet may contain (e.g., within headers and footers) information about the source and destination ports of the packet, information about a user responsible for distributing the packet, information about the formatting of the packet, and/or any additional information related to the packet. In general, communication 218 may represent any unit of formatted data that may be received by, processed by, and/or distributed from network device 206.

The systems described herein may detect a communication between the endpoint device and a cloud-based application in a variety of ways. In some examples, detection module 106 may detect communication 218 as communication 218 is sent from endpoint device 202(1) to server 210(1). In other examples, detection module 106 may detect communication 218 as communication 218 is sent from server 210(1) to endpoint device 202(1). As will be explained in greater detail below, the systems described herein may analyze and identify a variety of information within communication 218 before forwarding communication 218 to a final destination (e.g., endpoint device 202(1) or server 210(1)).

Returning to FIG. 3, at step 306 one or more of the systems described herein may determine, at the network device, that access to the cloud-based application is protected by an authentication process. For example, determination module 108 may, as part of network device 206 in FIG. 2, determine that access to cloud-based application 202(1) is protected by authentication process 220.

The term "authentication process," as used herein, generally refers to any type or form of procedure, task, or series of steps that may be used to verify at least in part the identity of a user or entity. In some examples, a user may be restricted from accessing all or a portion of an application or service until an authentication process is completed. As an example, an authentication process may require that a user submit appropriate input (e.g., an authentication credential) associated with the user. An authentication process may involve the completion of any number of steps or authentication factors. In addition, in some examples, an authentication process may involve a service or entity verifying an authentication credential provided by a user and asserting verification of the credential to an application such that the user is granted access to content within the application.

The systems described herein may determine that access to the cloud-based application is protected by an authentication process in a variety of ways. In some examples, determination module 108 may determine that access to cloud-based application 212(1) is protected by authentication process 220 by determining that communication 218 requests completion of authentication process 220. For example, determination module 108 may determine that communication 218 explicitly contains (e.g., within the payload of communication 218) a request for authentication credential 216.

In other examples, determination module 108 may determine that communication 218 contains a request to establish communication between endpoint device 202(1) and application 212(1). Determination module 108 may then determine that access to application 212(2) is protected by authentication process 220 in response to identifying the request within communication 218. For example, determination module 108 may determine that application 212(1) represents an application known to implement authentication process 220. In addition, determination module 108 may query application 212(1) to identify any authentication processes implemented by application 212(1).

Additionally or alternatively, determination module 108 may determine that access to cloud-based application 212(1) is protected by authentication process 220 by determining that cloud-based application 212(1) requests the user to complete at least a portion of authentication process 220 on endpoint device 202(1). For example, determination module 108 may determine that authentication process 220 prompts the user to enter login credentials into a user interface within endpoint device 202(1). Determination module 108 may determine that application 212(1) requests the user to complete a portion of authentication process 220 on endpoint device 202(1) by receiving a communication from cloud-based application 212(1) that indicates the portion of authentication process 220 to be completed on endpoint device 202(1), receiving a communication associated with authentication process 220 from endpoint device 202(1), and/or in any additional manner.

Returning to FIG. 3, at step 308 one or more of the systems described herein may cause the network device to complete at least a portion of the authentication process for the user by providing the authentication credential associated with the user from the network device to an identity provider of the cloud-based application. For example, completion module 110 may, as part of network device 206 in FIG. 2, cause network device 206 to complete at least a portion of authentication process 220 by providing authentication credential 216 from network device 206 to identity provider 214(1).

The term "identity provider," as used herein, generally refers to any type or form of entity, service, website, or server that asserts the identity or provides authorization of a user to an online application (e.g., a service provider). For example, an identity provider may receive and verify authentication credentials associated with a user and provide verification of the authentication credentials to an application such that the user is granted access to the application. In some embodiments, an identity provider may represent a third-party application or backend server that communicates with an application (e.g., identity providers 214(1)-(N) may be maintained outside servers 210(1)-(N)). In other embodiments, the functionality of an identity provider may be included within an application (e.g., identity providers 214(1)-(N) may be managed by and/or contained within applications 212(1)-(N), as shown in FIG. 2).

The systems described herein may provide the authentication credential associated with the user to an identity provider of the cloud-based application in a variety of ways. In some examples, completion module 110 may provide authentication credential 216 to identity provider 214(1) by including authentication credential 216 within communication 218. For example, if network device 206 receives communication 218 as communication 218 is routed from endpoint device 202(1) to application 212(1), completion module 110 may, at network device 206, insert, incorporate, or otherwise include authentication credential 216 within communication 218 and then forward communication 218, including authentication credential 216, to identity provider 214(1). Additionally or alternatively, completion module 110 may provide authentication credential 216 to identity provider 214(1) by including authentication credential 216 within a separate communication directed to identity provider 214(1).

Specifically, if authentication credential 216 represents a private key assigned to the user, completion module 110 may sign all or a portion of communication 218 or an additional communication with the private key and then forward the signed communication to identity provider 214(1). For example, if network device 206 communicates with application 212(1) via an HTTP protocol, completion module 110 may provide authentication credential 216 to identity provider 214(1) via a Secure Socket Layer (SSL) handshake. In some examples, completing an SSL handshake may involve network device 206 and identity provider 214(1) (or a backend server, such as an SSL termination proxy) exchanging information that enables communication via SSL. Completion module 110 may then authenticate identity provider 214(1) at network device 206 (e.g., by verifying certificate signed by identity provider 214(1)). Next, identity provider 214(1) may request authentication of network device 206. In response to this request, completion module 110 may sign a portion of data (e.g., data that is unique to a particular SSL session and is known by both parties) with authentication credential 216. Completion module 110 may then submit the signed data to identity provider 214(1) (e.g., via TCP keep-alive packets or a separate channel), where the signature may be verified.

Notably, in some examples, completion module 110 may include authentication credential 216 and/or an additional authentication credential within every communication received at and forwarded from network device 206. For example, rather than consuming time and computing resources to explicitly determine that a communication is directed to a cloud-based application protected by an authentication process, the systems described herein may assume that each communication sent from network device 206 might be directed to such a cloud-based application. In some examples, including an authentication credential within each communication sent from network device 206 may ensure that cloud-based applications configured to verify the identity of the user may receive the appropriate authentication credential.

In some examples, after completion module 110 provides authentication credential 216 to identity provider 214(1), identity provider 214(1) or an additional entity may complete at least a portion of authentication process 220 by verifying authentication credential 216. For example, if authentication credential 216 represents a username and/or password associated with the user, identity provider 214(1) may determine that the username and/or password matches authentication credentials previously stored within identity provider 214(1). In another example, if authentication credential 216 represents a symmetric key associated with the user, identity provider 214(1) may verify authentication credential 216 by decrypting a communication encrypted with the symmetric key using the same symmetric key. Alternatively, if authentication credential 216 represents a private key associated with the user, identity provider 214(1) may verify authentication credential 216 using a public key that corresponds to the private key. Specifically, identity provider 214(1) may use the public key to decrypt a communication signed with the private key. In examples where completion module 110 submits the signed communication to an SSL termination proxy, the SSL termination proxy may verify the signature and report (e.g., via HTTP headers) the verification to identity provider 214(1).

Furthermore, in embodiments where cloud-based application 212(1) requests that the user complete at least a portion of authentication process 220 on endpoint device 202(1), identity provider 214(1) may determine (e.g., by receiving verification from network device 206) that the user has entered appropriate credentials into network device 206 or otherwise completed the portion of authentication process 220.

Once identity provider 214(1) verifies authentication credential 216, identity provider 214(1) may assert the identity of the user to cloud-based application 212(1). In some examples, determination module 108 may determine that authentication process 220 is complete based on identity provider 214(1) asserting the identity of the user to cloud-based application 212(1) and/or determining that the user has completed a portion of authentication process 220 on endpoint device 202(1). In response to the determination that authentication process 220 is complete, facilitating module 112 may cause network device 206 to facilitate access for the user to the cloud-based application. For example, facilitating module 112 may direct network device 206 to forward any subsequent communications between endpoint device 202(1) and application 212(1) such that the user may access application 212(1) via endpoint device 202(1).

In some embodiments, authentication process 220 may include or require the completion of a single authentication factor. For example, the single authentication factor may include network device 206 providing authentication credential 216 to identity provider 214(1). In such a single-factor authentication process, the user may be granted access to application 212(1) in response to completion of the single authentication factor. In some examples, the network devices described herein may complete a single-factor authentication process for application 212(1) instead of requiring the user to complete all or a portion of the authentication process on endpoint device 202(1) (e.g., by entering login credentials into endpoint device 202(1)). As such, the disclosed systems may improve the efficiency and usability of endpoint device 202(1) by eliminating the need for a user to enter credentials into a device not designed for user interaction. In addition, the systems described herein may increase the security of information within application 212(1) by reducing the frequency with which the user is required to enter authentication credentials into endpoint device 202(1) (e.g., reducing the probability that an unauthorized party will gain access to the authentication credentials while the user is entering the credentials into endpoint device 202(1)).

In other embodiments, authentication process 220 may include or require completion of a first authentication factor and at least one additional authentication factor. For example, the first authentication factor in a two-factor authentication process may include network device 206 providing authentication credential 216 to identity provider 214(1), as in the single-factor authentication process described above. In addition, the second authentication factor in a two-factor authentication process may be completed at endpoint device 202(1) (e.g., by entering login credentials into endpoint device 202(1), as in the traditional authentication process described above). In general, a multi-factored authentication process implemented by the systems described herein may require completion of any number of authentication factors at endpoint device 202(1) and/or network device 206, which may complete any factor in a multi-factored authentication process.

Furthermore, in some examples, one or more of modules 102 may facilitate authentication processes for multiple devices within endpoint devices 202(1)-(N). For example, detection module 106 may detect, at network device 206, a second communication between a second device (e.g., endpoint device 202(2)) and application 212(1). Next, determination module 108 may determine, at network device 206, that access to application 212(1) from endpoint device 202(2) is protected by a second authentication process. In addition, completion module 110 may cause network device 206 to complete at least a portion of the second authentication process for the user by providing authentication credential 216 and/or an additional authentication credential from network device 206 to identity provider 214(1). In this way, the systems described herein may efficiently provide a user access to multiple cloud-based applications via multiple endpoint devices within the same network.

The systems and methods described herein may be implemented in a variety of ways and provide a number of advantages. As explained above, by providing an authentication credential associated with a user to a cloud-based application, the systems and methods described herein may facilitate providing the user access to the cloud-based application. Specifically, by providing an authentication credential via a network device, the disclosed systems and methods may eliminate the need for a user to enter login credentials into a device not designed for user interaction and/or may provide an additional level of security for information stored within a cloud-based application. Furthermore, the described systems and methods may enable a user to quickly and easily access a variety of cloud-based applications hosted on multiple devices within a network by facilitating authentication of the user to the cloud-based applications via a network device that handles traffic for all devices within the network.

Figure 4:
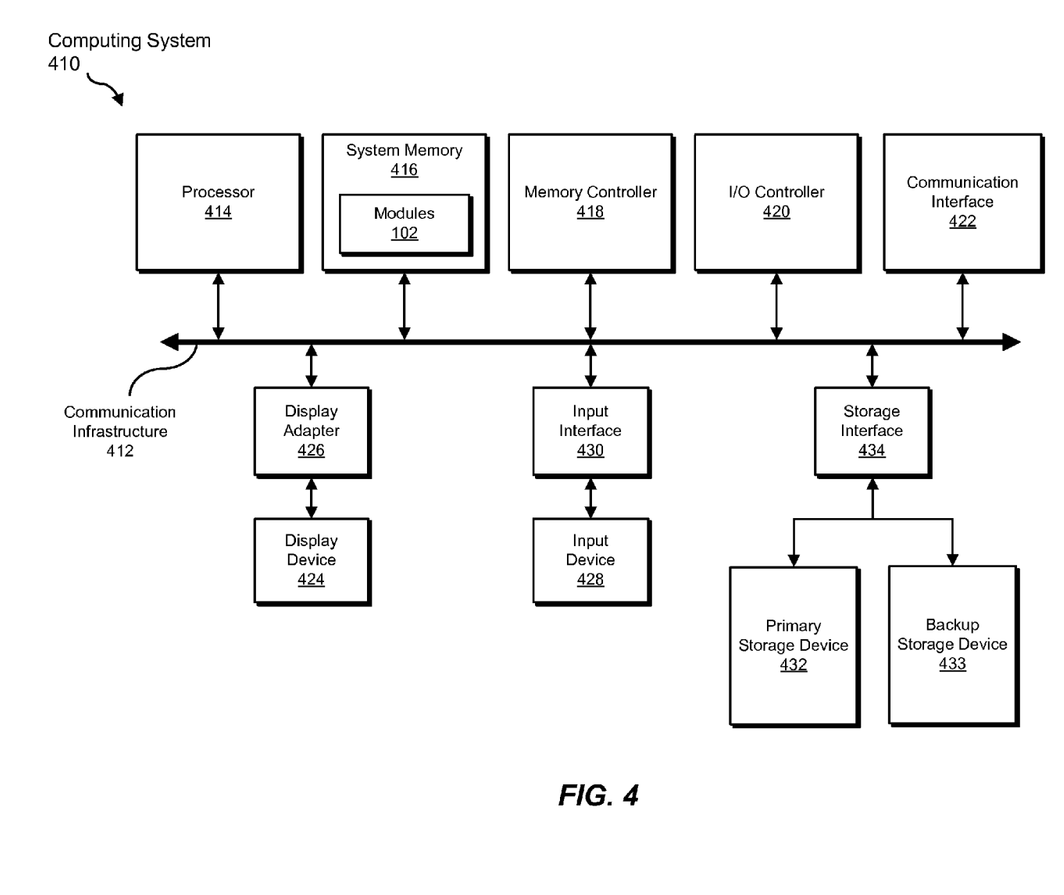
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
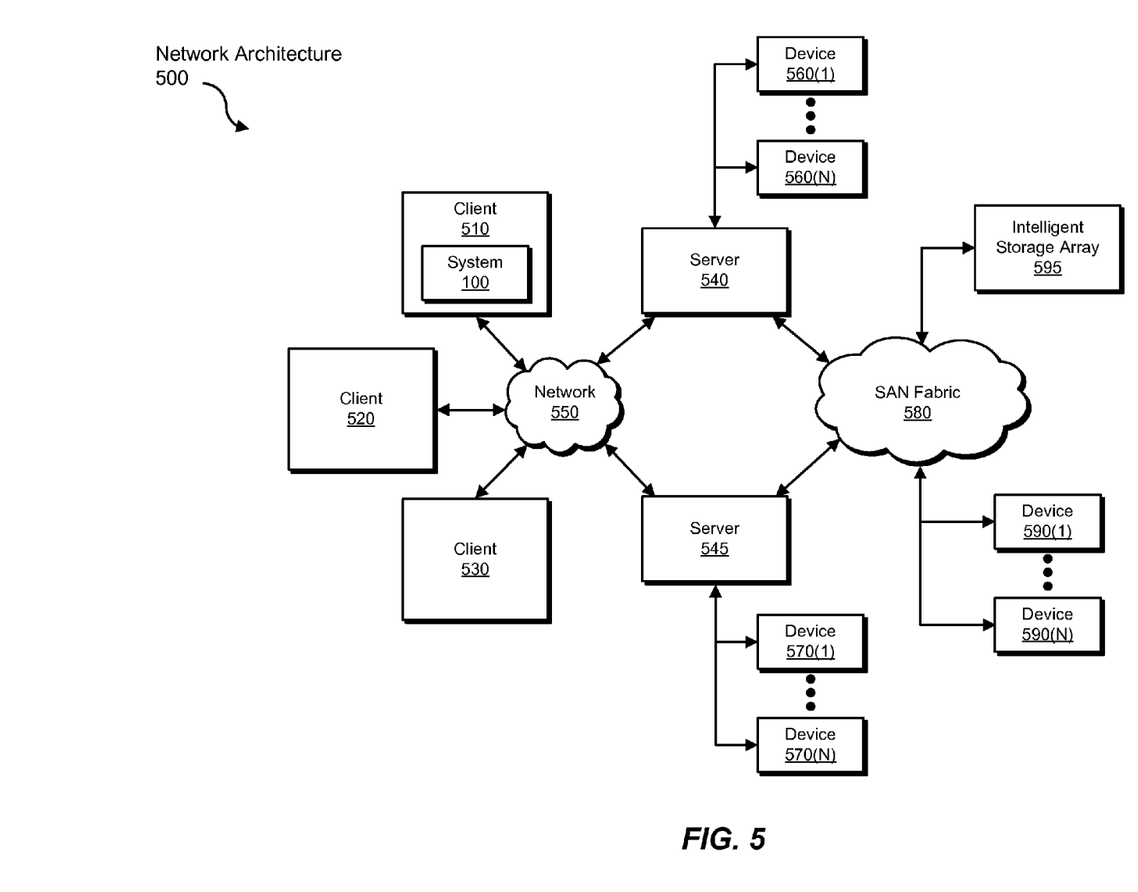
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for performing authentication at a network device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a communication between an endpoint device and a cloud-based application to be transformed, transform the communication, output a result of the transformation to the endpoint device and/or cloud-based application, and use the result of the transformation to provide a user access to the cloud-based application via the endpoint device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing authentication at a network device, at least a portion of the method being performed by a computing device comprising at least one processor, the method comprising:
storing, at a router that forwards traffic received from at least one endpoint device within a network, an authentication credential associated with a user of the endpoint device, wherein the endpoint device is not designed for user interaction and does not provide user interfaces that enable users to efficiently complete authentication processes;
detecting, at the router, a communication between the endpoint device within the network and a cloud-based application outside the network;
determining, at the router, that access to the cloud-based application is protected by an authentication process; and
causing the router to complete at least a portion of the authentication process for the user by providing the authentication credential associated with the user from the router to an identity provider of the cloud-based application.

2. The method of claim 1, further comprising:
detecting, at the router, a second communication between a second endpoint device within the network and the cloud-based application;
determining, at the router, that access to the cloud-based application from the second endpoint device is protected by a second authentication process; and
causing the router to complete at least a portion of the second authentication process for the user by providing the authentication credential associated with the user from the router to the identity provider of the cloud-based application.

3. The method of claim 1, wherein the authentication credential associated with the user comprises at least one of:
a private key assigned to the user;
a username created by the user; and
a password created by the user.

4. The method of claim 1, wherein:
detecting the communication between the endpoint device and the cloud-based application comprises detecting a communication sent from the endpoint device to the cloud-based application; and
providing the authentication credential associated with the user comprises signing the communication with a private key assigned to the user and forwarding the signed communication to the identity provider.

5. The method of claim 1, further comprising, after providing the authentication credential to the identity provider:
determining that the identity provider verifies the authentication credential and asserts the identity of the user to the cloud-based application; and
causing the router to facilitate access for the user to the cloud-based application.

6. The method of claim 1, wherein determining that access to the cloud-based application is protected by the authentication process comprises determining that the communication between the endpoint device and the cloud-based application requests completion of the authentication process.

7. The method of claim 1, wherein determining that access to the cloud-based application is protected by the authentication process comprises determining that the cloud-based application requests the user to complete at least a portion of the authentication process on the endpoint device before being granted access to the cloud-based application.

8. The method of claim 1, wherein:
the authentication process comprises completion of a single authentication factor; and
the router, by providing the authentication credential to the identity provider, completes the single authentication factor.

9. The method of claim 1, wherein the authentication process comprises completion of a first authentication factor and at least one additional authentication factor, wherein:
the router, by providing the authentication credential to the identity provider, completes the first authentication factor; and
the additional authentication factor is completed at the endpoint device.

10. The method of claim 1, wherein the endpoint device comprises an internet-enabled television.

11. The method of claim 1, wherein the endpoint device comprises an internet-enabled device that provides media content to a television.

12. A system for performing authentication at a network device, the system comprising:
a storing module, stored in memory, that stores, at a router that forwards traffic received from at least one endpoint device within a network, an authentication credential associated with a user of the endpoint device, wherein the endpoint device is not designed for user interaction and does not provide user interfaces that enable users to efficiently complete authentication processes;
a detection module, stored in memory, that detects, at the router, a communication between the endpoint device within the network and a cloud-based application outside the network;
a determination module, stored in memory, that determines, at the router, that access to the cloud-based application is protected by an authentication process;
a completion module, stored in memory, that causes the router to complete at least a portion of the authentication process for the user by providing the authentication credential associated with the user from the router to an identity provider of the cloud-based application; and
at least one processor that executes the storing module, the detection module, the determination module, and the completion module.

13. The system of claim 12, wherein:
the detection module further detects, at the router, a second communication between a second endpoint device within the network and the cloud-based application outside the network;
the determination module further determines, at the router, that access to the cloud-based application from the second endpoint device is protected by a second authentication process; and
the completion module further causes the router to complete at least a portion of the second authentication process for the user by providing the authentication credential associated with the user from the router to the identity provider of the cloud-based application.

14. The system of claim 12, wherein the authentication credential associated with the user comprises at least one of:
a private key assigned to the user;
a username created by the user; and
a password created by the user.

15. The system of claim 12, wherein:
the detection module detects the communication between the endpoint device and the cloud-based application by detecting a communication sent from the endpoint device to the cloud-based application; and the completion module provides the authentication credential associated with the user by signing the communication with a private key assigned to the user and forwarding the signed communication to the identity provider.

16. The system of claim 12:

wherein after the authentication credential is provided to the identity provider, the determination module further determines that the identity provider verifies the authentication credential and asserts the identity of the user to the cloud-based application; and further comprising a facilitating module that causes the router to facilitate access for the user to the cloud-based application in response to the determination that the identity provider verifies the authentication credential.

17. The system of claim 12, wherein the determination module determines that access to the cloud-based application is protected by the authentication process by determining that the communication between the endpoint device and the cloud-based application requests completion of the authentication process.

18. The system of claim 12, wherein the determination module determines that access to the cloud-based application is protected by the authentication process by determining that the cloud-based application requests the user to complete at least a portion of the authentication process on the endpoint device before being granted access to the cloud-based application.

19. The system of claim 12, wherein:

the authentication process comprises completion of a single authentication factor; and the completion module causes the router to complete the single authentication factor by providing the authentication credential to the identity provider.

20. A non-transitory computer-readable medium comprising one or more computer-executable instructions that, when executed by at least one processor of a computing device, cause the computing device to:

store, at a router that forwards traffic received from at least one endpoint device within a network, an authentication credential associated with a user of the endpoint device, wherein the endpoint device is not designed for user interaction and does not provide user interfaces that enable users to efficiently complete authentication processes;

detect, at the router, a communication between the endpoint device within the network and a cloud-based application outside the network;

determine, at the router, that access to the cloud-based application is protected by an authentication process; and cause the router to complete at least a portion of the authentication process for the user by providing the authentication credential associated with the user from the router to an identity provider of the cloud-based application.

* * * * *